United States Patent [19]

Wingard, Jr. et al.

[11] 4,260,714
[45] Apr. 7, 1981

[54] ACETAMIDOETHYLENE COPOLYMERS

[75] Inventors: Robert E. Wingard, Jr., Palo Alto; William J. Leonard, Jr., San Francisco, both of Calif.

[73] Assignee: Dynapol, Palo Alto, Calif.

[21] Appl. No.: 40,030

[22] Filed: May 18, 1979

[51] Int. Cl.³ .......................... C08F 220/54
[52] U.S. Cl. .................. 526/271; 525/336; 525/384; 526/303
[58] Field of Search ............ 526/271, 303

[56] References Cited

U.S. PATENT DOCUMENTS

| | | | |
|---|---|---|---|
| 3,165,489 | 1/1965 | Roth | 526/303 |
| 3,207,732 | 9/1965 | Lynn | 526/303 |
| 3,212,972 | 10/1965 | Bailey | 526/303 |
| 3,355,394 | 11/1967 | Korbanka et al. | 526/303 |
| 3,696,085 | 10/1972 | Lederer et al. | 526/303 |
| 4,018,826 | 4/1977 | Gless et al. | 260/583 P |

*Primary Examiner*—Harry Wong, Jr.
*Attorney, Agent, or Firm*—William H. Benz

[57] ABSTRACT

Copolymers of acetamidoethylene are disclosed. These materials have randomly distributed units represented by the formula

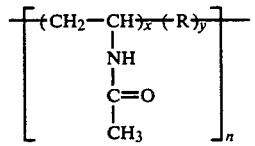

wherein R is one or more radicals selected from the group

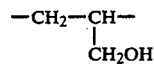

and the $C_1$ to $C_6$ carboxylic acid esters thereof,

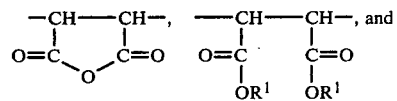

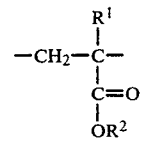

wherein $R^1$ is hydrogen or a $C_1$ to $C_6$ alkyl, and $R^2$ is a $C_1$ to $C_6$ alky; x and y are numbers greater than zero which total to 1.00; the ratio of x to y from about 0.05:0.95 to about 0.95:0.05; and n is an integer from about 14 to about 10,000.

The copolymers are useful as epoxy resin curing agents, as components of protective or decorative coatings, and as intermediates in the formation of vinylamine group-containing copolymers having the formulae

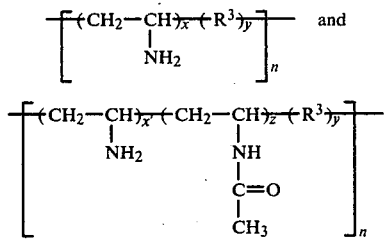

wherein x, y and n are as previously defined, x' plus z equals x and $R^3$ is one or more of the radicals selected from the group

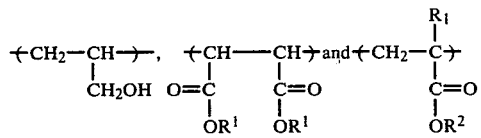

wherein $R^1$ and $R^2$ are as previously defined.

10 Claims, No Drawings

ACETAMIDOETHYLENE COPOLYMERS

FIELD OF THE INVENTION

This invention relates to copolymers of acetamidoethylene. More particularly, this invention relates to copolymers of acetamidoethylene and one or more of the radicals dialkyl fumarate, the alkyl acrylates, the alkyl alkacrylates, and the hydrolysis products thereof.

DESCRIPTION OF PRIOR ART

Acetamidoethylene and vinylamine are inherently attractive materials. The amine materials offer the chemically useful functionality of a primary amine unit in concert with the particular advantages of polymeric form. Acetamidoethylene homopolymers are shown by Gless et al, U.S. Pat. No. 4,018,826, and a wide range of disclosures of vinylamine homopolymers have been made (see, for example Reppe, W.; *Reichsant Wirtschaftsansban Chem. Ber.* 38, (PB 52007) 37-68 (1940) and Hart; *Makromol. Chem.* 32, 51-6 (1959). The art on copolymers has been relatively scarce. Otteson et al., U.S. Pat. No. 4,107,336, discloses vinylamine/vinylsulfonate copolymers and acetamidoethylene/vinylsulfonate. Dawson et al., U.S. Pat. No. 3,920,855, shows vinylamine/acrylic acid copolymers, while ethylene/vinylamine and vinylalcohol/vinylamine copolymers are shown as well at G.B. Pat. No. 948,701 and *Vysokomolekul. Sodin* 5, 547-51 (1963). One reason for this seeming small amount of art on copolymers may be a practical one. Vinylamine as such does not exist and heretofore acetamidoethylene (a monomer which can yield vinylamine units in polymers) has been expensive to make and not commercially available. Thus, the interest in preparing vinylamine or acetamidoethylene copolymers has been very minimal.

SUMMARY

In summary, this invention concerns copolymers having randomly distributed repeating units represented by General Formula I.

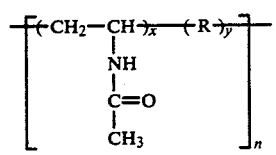

wherein R is the radical selected from the group

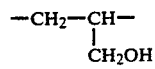

and the $C_1$ to $C_6$ carboxylic acid esters thereof;

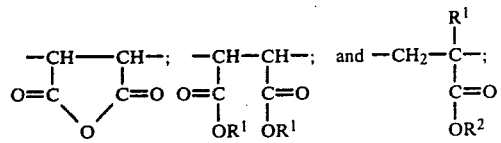

wherein $R^1$ is hydrogen or a $C_1$ to $C_6$ alkyl and $R^2$ is a $C_1$ to $C_6$ alkyl; x and y are numbers greater than 0 which total to 1.00; the ratio of x to y from about 0.05:0.095 to about 0.95:0.05; and n is an integer from about 14 to about 10,000.

Second and third aspects of this invention concern amine-containing copolymers derivable from the copolymers of Formula I. These materials have randomly distributed repeating units represented by the General Formulae II and III, respectively.

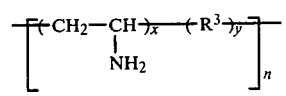

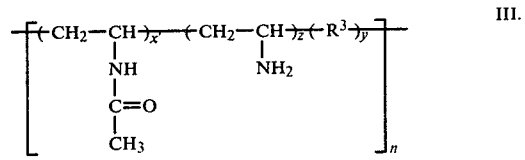

wherein $R^3$ is a radical selected from among

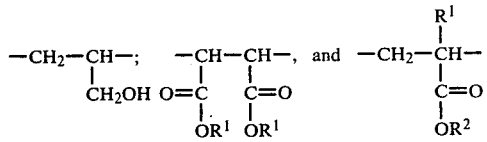

wherein $R^1$, $R^2$, x, y, z and x' are as previously defined.

The copolymers of Formulae II and III are derived from the copolymers of Formula I by hydrolysis and in some cases esterification of free acid groups. The materials of Formula I are prepared by catalytically copolymerizing a mixture of acetamidoethylene with one or more of the comonomers selected from allyl alcohol and the $C_1$ to $C_6$ alkyl esters thereof, maleic anhydride, the $C_1$ to $C_6$ alkyl diesters of fumaric acid, the $C_1$ to $C_6$ alkyl esters of acrylic acid, and the $C_1$ to $C_6$ alkyl esters of the $C_1$ to $C_6$ alkacrylic acids, in bulk or in solution. This will yield the products of General Formula I which may be recovered by precipitation from the polymerization solution. Alternatively, either with or without intermediate recovery, the products of General Formula I may be subjected to full or partial hydrolysis with a mineral acid at elevated temperature to convert a portion or all of the $C_1$ to $C_6$ alkyl vinylamide groups to vinylamine groups, that is to give materials of Formula II or III, respectively.

Those skilled in the art will recognize that the conditions that will effect hydrolysis of the vinylamide groups will also, to at least a limited extent, hydrolyze maleic anhydride, fumaric acid ester, acrylic and alkacrylic acid ester comonomer units to free acids, and allyl alcohol ester comonomer units to free alcohol. If desired, fumaric acid, acrylic acid, and alkacrylic acid ester groups can be restored by postesterification with the appropriate $C_1$ to $C_6$ alkanol. The products of Formula II or III may be recovered by precipitation as well.

The copolymers of the present invention can be further treated and, in one aspect of the invention, are used to cure epoxide resins which can be used as, for example, adhesives, impregnants, potting resins, etc. They also may be used as components of protective or decorative coating formulations.

DETAILED DESCRIPTION OF THE INVENTION

The Copolymers

The copolymers of the present invention generically described as copolymers of vinylamine and/or acetamidoethylene with polar comonomers. They are depicted by General Formulae I, II and III. The materials of Formula I are copolymers which result from the catalytic copolymerization of acetamidoethylene (also known as vinylacetamide) with one or more of the unsaturated polar comonomers allyl alcohol, $C_1$ to $C_6$ carboxylic acid esters of allyl alcohol, maleic anhydride, the $C_1$ to $C_6$ alkyl diesters of fumaric acid, the $C_1$ to $C_6$ alkyl esters of acrylic acid, and the $C_1$ to $C_6$ alkyl esters of the $C_1$ to $C_6$ alkacrylic acids. Preferred comonomers for the materials of Formula I are allyl alcohol, maleic anhydride, dimethyl and diethyl fumarate, and methyl and ethyl acrylate and methacrylate. More preferred comonomers are allyl alcohol and methylacrylate and methacrylate.

The amide:polar comonomer ratio in the materials of Formula I can vary widely. Generally, however, it is preferred to have this ratio from 0.05:0.95 to 0.95:0.05, that is with 5% mer or more of each of the two components, with ratios of from 0.25:0.75 to 0.75:0.25 being more preferred. These ratios serve to define the relationship of members x and y in Formula I. In the Formulae, the sum of x and y is 1.00. The number of units of amide plus comonomer, shown as in I, range from about 14 to about 10,000. From a molecular weight viewpoint, this means, in the case of a 1:1 amide:maleic anhydride material a molecular weight range of from about 1300 to about 850,000. For the full range of comonomers and ratios the values of 14 to 10,000 units yield a molecular weight of from about 1000 to about 1,000,000. Preferred number (n) of units is from about 50 to about 6000 units (molecular weight range of 3000 to 750,000) with values of n of from about 1000 to 6000 (molecular weight 60,000 to 750,000) being more preferred.

The amine group-containing materials of Formulae II and III are derived from the amide copolymeric materials of Formula I via hydrolysis with a mineral acid and in certain cases reesterifying free acid groups. The hydrolyzed copolymers are recovered such as by precipitation or solvent evaporation.

Formula II represents the situation wherein essentially all of the amide units have been hydrolyzed to amines. Formula III represents hydrolysis of only a portion of the amide units. As previously mentioned, the conditions which will hydrolyze the amides to amines will also hydrolyze the hydrolyzable comonomeric units such as esters and maleic anhydride.

The comonomeric units which are present in the materials of II and III include the "allyl alcohol residue"

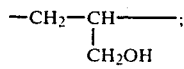

the "fumaric acid residue"

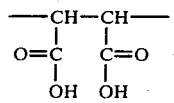

which result from hydrolysis of maleic anhydride and fumaric acid diesters; "fumaric acid diester residues"

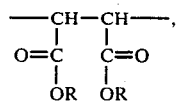

wherein R is a $C_1$ to $C_6$ alkyl radical, preferably $CH_3$ to $C_2H_5$ groups, which result by reesterification of the "fumaric acid residues," with the corresponding $C_1$ to $C_6$ alkanol in the presence of strong acid; the $C_1$ to $C_6$ alkyl esters of acrylic acid, and the $C_1$ to $C_6$ alkyl ester of the $C_1$ to $C_6$ alkacrylic acids, both of which are produced by reesterifying the free acids formed in the hydrolysis with the appropriate $C_1$ to $C_6$ alkanol in the presence of strong acid. Among these groups, the allyl alcohol residue, the dimethyl and diethyl esters of fumaric acid residue and the methyl ester of acrylic and methacrylic acid residues are preferred.

The ratio of these comonomer units to the total amine plus amide units is the same in the materials of Formulae II and III as the ratio of comonomer units to amide units in the materials of Formula I, both in general and in preference. Therefore, in Formula II, the ratio of x to y is from 0.05:0.95 to 0.95:0.05 and preferably is from 0.25:0.75 to 0.75:0.25. In Formula III the ratio of x'+z to y has the same values.

The degree of hydrolysis of amide units obviously can vary over a wide range as, in effect, Formula I represents 0% hydrolysis; II represents 100% hydrolysis and III represents intermediate degrees. In general, the ratio of x' to z is from about 0.05:0.95 to 0.95:0.05 with materials having x' to z ratios of 0.10:0.90 to 0.90:0.10 being preferred.

n, the number of units of copolymer, has the same value in Formulae II and III are set forth in the description of Formula I.

PREPARATION OF THE MATERIALS

The preparation of the copolymers I of the present invention is accomplished by reacting acetamidoethylene monomer in bulk or in solution (or dispersion) with the previously disclosed olefinically unsaturated comonomers in the presence of a free radical initiator. The stoichiometry of the acetamidoethylene monomer and comonomer(s) employed is in the ratios set forth, that is 0.05:0.95 to 0.95:0.05. While ratios outside of these can also successfully provide copolymers, the properties of the resulting polymers do not differ sufficiently from the pure acetamidoethylene or comonomer homopolymer so as to provide significant advantageous properties. The reaction may be carried out in bulk (or in dispersion) and preferably in solution. When carried out under the latter conditions, two classes of suitable solvents (dispersants) may be used. Polar inert hydrogen bonding liquids are suitable and function as solvent for the monomers and polymer product. These are illustrated by, for example, water and the lower alkanols such as methanol, ethanol or isopropanol, and mixtures of alkanols with water. Nonpolar inert liquids such as hydrocarbons, ethers and ketones are also suitable, functioning as monomer solvents but not as solvents for the polymer, such that the polymer forms a second phase. Lower alkanols of from 1 to 5 carbons such as methanol, isopropanol, n-butanol and the like, and mixtures with up to 80% water are preferred media, with aqueous methanol being most preferred.

The amount of reaction media is generally selected to provide a concentration of reactant monomers from about 10% to 50% by weight. Lower concentrations can be employed, but do not appear to offer any significant advantage.

A free-radical initiator is employed as catalyst. Suitable catalysts include the organic peroxides and other materials known in the art for this purpose. A commonly available and thus preferred catalyst is AIBN, 2,2-azobis-(2-methylpropionitrile). The amount of catalyst employed is generally from 0.5 to 5.0 mole % relative to total vinyl units, with 1.0 to 2.5 mole % being preferred.

The polymerization is carried out at a moderately elevated temperature such as from about 25° to about 125° with temperatures of from 50° to 110° being preferred. The polymerization requires from about 2 to 72 hours, and preferably 4 to 48 hours, to complete, depending upon the exact temperature, catalyst, and reactant concentration employed. Typically, the reaction is monitored by NMR, gas chromatography, or TLC for unreacted monomers and the reaction continued until no significant monomer remains, for example, less than 5%, preferably less than 1%. The polymer is recovered by precipitation in a nonsolvent or by evaporation of solvent. Typical nonsolvents include nonpolar organic liquids such as ketones, ethers and hydrocarbons. Suitable nonsolvents include acetone, methylethylketone, methylisobutylketone, diethylether, diisopropylether, hexane, cyclohexane, n-pentane, benzene, and the like.

Following precipitation, the copolymer product of Formula I is recovered and optionally washed and dried.

To form the materials of Formulae II or III the copoly(vinylacetamide) product of Formula I is hydrolyzed partially or completely to the copoly(vinylamine) salt and optionally esterified. The hydrolysis is suitably carried out in water in the presence of a strong acid. At least one equivalent of acid per equivalent of acetamide content of the copolymer should be used, such as from 1.05 to 3 equivalents of acid per equivalent of acetamide content. Too great an excess of acid can cause the hydrolysis product to precipitate prematurely. Suitable acids include, for example, hydrochloric, sulfuric, p-toluene sulfonic, trifluoroacetic and hydrobromic acids, with hydrochloric acid being preferred. This hydrolysis is preferably carried out at elevated temperatures such as at the reflux temperature of the solution, but temperatures in the range of from about 25° to 175° may be employed and, depending upon the temperature, requires from about 1 hour to about 36 hours, preferably 8 hours to 24 hours, to complete. The hydrolysis reactions can be conducted with polymer concentrations ranging from 1 to 30%, with 10 to 20% being preferred.

Following hydrolysis, the polymer salt can be recovered by: (1) further acidifying to cause it to precipitate; (2) directly precipitating the reaction mixture into a water-miscible nonsolvent such as a lower alkanol or acetone; or (3) evaporating the solvent and excess acid, provided the acid is volatile (e.g., HCl or HBr). The product is the substantially linear repeating unit of the formula

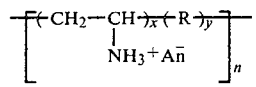

where An is the anion corresponding to the acid employed in the hydrolysis and R, x, y and n are as previously defined. Such materials are classifiable as acid addition salts and include the hydrochlorides, etc. that correspond to the acid used for hydrolysis.

The process may be halted at this point, yielding as its product the copolymerized vinylamine salt. It also may be carried further, such as to form the free amine. This conversion may be effected by contacting the salt with an aqueous base such as an alkali metal or alkaline earth metal oxide or hydroxide, at a pH of 10 or greater. Typical useful bases include sodium hydroxide and potassium hydroxide. Other basic materials may be used as well, but are not as economically advantageous. This neutralization may be carried out at temperatures in the range of 15°–50° such as at room temperature. This yields the copolymeric free amine which may be isolated and dried, if desired. The polyvinylamine product is a linear polymer. It is water-soluble and has a formula

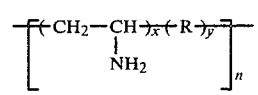

wherein R, x, y and n are as previously defined. It will be appreciated that by halting the hydrolysis prior to completion one can achieve the terpolymeric amine/amide materials of Formula III. This is generally best carried out by monitoring the degree of hydrolysis and cooling or neutralizing when the desired amine/amide ratio is achieved. Conversion from the terpolymer acid addition salt to the free amine proceeds similarly to the case of complete esterification.

As previously noted, certain materials of this invention have both free amines and acid esters (either "fumaric acid" esters, acrylate, or alkacrylate esters). In these cases, since the hydrolysis conditions can be correctly assumed to remove the esterifying groups, they must be reintroduced. Conventional methods known to the art for this esterification may be used. For simplicity, the Fischer esterification, wherein the polymeric acid is contacted with an excess of the alkanol corresponding to the ester group such as methanol, ethanol, or n-butanol in the presence of a strong acid, such as dry HCl, is preferred. Reaction temperatures are moderate, typically from about 10° C. to about 110° C., with times of from about 0.1 hour to about 1 hour. This reaction is generally carried out with from 1.05 to about 10 moles of alcohol per mole of esterification desired, although larger excesses of alkanol may be employed, if desired.

USE OF THE MATERIALS

The materials of this invention are attractive, useful compounds in view of their mixed functionality. They find specific application as epoxy resin-curing agents, as components of metal coating compositions and as components of paints and other coating materials.

The epoxy resins which can be polymerized include epoxy compounds and epoxides of the polymeric type and they can be aliphatic, cycloaliphatic, aromatic or heterocylic and will typically have an epoxy equivalency (i.e., the number of epoxy groups contained in the average molecule) of from 1.0 to 6.0, preferably 1 to 3, this value being the number average molecular weight of the epoxide divided by the epoxide equivalent weight. Such epoxide monomers as well known—see "Handbook of Epoxy Resins," by Lee and Neville, McGraw-Hill Book Company, New York (1967) and "Epoxy Resin Technology," by P. F. Bruins, John Wiley & Sons, Inc., New York (1968).

Particularly useful epoxides which can be used with this invention are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl) adipate and mixtures thereof as well as mixtures thereof with co-curatives, curing agents, or hardeners which also are well known (see Lee and Neville and Bruins, supra). Representative of the co-curatives or hardeners which can be used are acid anhydrides such as nadic methyl anhydride, cyclopentanetetracarboxylic dianhydride, methendic anhydride, cis-1,2-cyclohexanedicarboxylic anhydride, and mixtures thereof. For a more detailed list of useful epoxides of this nature, reference is made to U.S. Pat. No. 3,117,099.

In general, the epoxy resin polymerization can be carried out at room temperature (or as low as 0° in some cases) in the case of the nonlatent catalysts, though elevated temperatures, e.g., 30° to 200°, preferably 50° to 100°, can be used to accelerate the cure. In the case of latent catalysts, temperatures generally in the range of 50° to 250°, preferably from 80° to 150°, can be used. The particular amount of catalyst to be used and temperature of polymerization will vary, of course, and be dependent on the particular monomers used and the particular catalyst used, as well as the particular application to be made.

The curable epoxy composition of this invention can be used to make shaped articles of self-supporting, structural, filled or reinforced epoxy resin composites, such as glass fiber cloth reinforced epoxy resin composites, useful, for example, as repair materials. The various filler and reinforcements and other particulate materials to be mixed or coated with or dispersed in the curable compositions of this invention, as well as methods of processing these materials in making the composites, and their applications, are those known to the art. In this connection, reference is made to "Modern Composite Materials," edited by Brautman and Krock, published by Addison-Wesley Publishing Company, Reading, Mass. (1967); and "Handbook of Fiberglass and Advances Plastics Composites," edited by G. Lubin, published by Van Nostrand Reinhold Company (1969).

A further understanding of the invention can be had from the following nonlimiting Preparation and Examples. As used herein, all temperatures and temperature ranges referred to are in the Centigrade system, and the terms ambient or room temperature refer to about 20° C. The term percent or (%) refers to weight percent and the term mole and moles refer to gram moles. The term equivalent refers to a quantity of reagent equal in moles to the moles of the preceding or succeeding reactant recited in that Preparation or Examples in the terms of moles of finite weight or volume.

PREPARATION

A. Preparation of Vinylacetamide.

To 462 g of acetamide (technical) is added 12.45 ml of 6M aqueous sulfuric acid, followed immediately by 168 ml (3 moles) of acetaldehyde (99+%). This mixture is stirred and heated until the internal temperature reaches 70° (nine minutes). After another minute of heating, the 95° clear solution spontaneously crystallizes, causing a temperature rise to 106°. The reaction product, ethylidene bisacetamide, is not separated. Heating and stirring are continued for another five minutes and a mixture of 60 g calcium carbonate (precipitated chalk) and 30 g soft glass powder is added. The resulting mixture is heated to cracking temperature and distilled at 40 mm Hg (200° bath temperature). When the internal temperature reaches 160° (0.5 hour), the receiver is changed. After another 1.7 hour, the distillation is almost over, the stirrer is stopped and the heating continued. Slow distillation continues for another hour and is then stopped. The first distillation fraction is 95.9 g of water and acetamide. The second fraction is 466 g of orange oil and crystals. NMR indicates this mixture to contain 195 g vinylacetamide (76% yield), 217 g acetamide, and 54 g ethylidene bisacetamide. This second fraction is diluted with isopropanol to form a stock solution.

EXAMPLE I

A. Into a one-liter flask is added 50 ml of vinylacetamide stock solution (containing 28.3 g/0.33 mol of vinyl acetamide). AIBN (1.30 g/7.93 mmoles) in 20 ml of methanol is added, followed by methyl methacrylate (33.0 g/0.33 mole) in 200 ml of water. This is one equivalent of methylmethacrylate per equivalent of vinylacetamide. Following deoxygenation, the mixture is heated to 60° and there maintained with stirring for 40 hours. This reaction mixture is then reduced in volume and added to acetone. The copolymer precipitate is collected and dried in vacuum to yield a solid copolymer having the formula

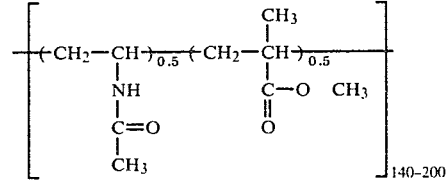

and a molecular weight of about $2 \times 10^4$. Whenever a molecular weight is given herein, it is to be derived by gel permeation techniques. In the primary technique, a silanized porous glass support is used with a 0.01 M LiBr in DMF eluent. Detection is by refractometer with standardization being based on suitable purchased poly(styrene) or poly(styrenesulfonate) standards.

B. Into a 500 ml flask is added half of the solid product recovered in A (0.167 mole of amide), 100 ml of water and 75 ml (0.90 mole) of concentrated hydrochloric acid. The mixture is heated at 75° C. for 24 hours, and then refluxed for 48 hours. A partially hydrolyzed sample is withdrawn after the 24 hour/75° C. period and added to stirred methanol to give an intermediate product. After the 48 hour reflux, the reaction mixture is added hot to about 12 liters of methanol to give a fine solid precipitate of final product.

The intermediate product and the final product are analyzed and found to be respectively of the general formulae

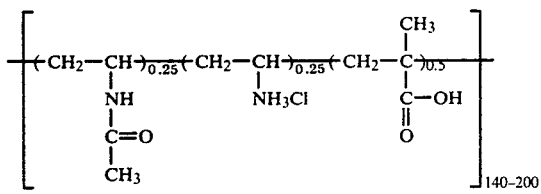

and

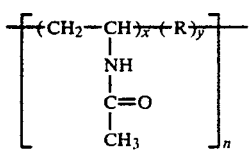

C. A portion of both products of Step B are further treated to restore the methacrylate methyl ester functionality. This is accomplished by treating the polymers with methanol and HCl under anhydrous conditions at reflux for 24 hours. This reesterifies the methacrylate groups.

EXAMPLE II

A. The preparations of Example I are repeated with the following variations. A equimolar amount of ethylacrylate is substituted for methylmethacrylate. During reesterification, ethanol is used instead of methanol. Sulfuric acid is used as catalyst to effect hydrolysis and esterification.

EXAMPLE III

The preparation of Example I is repeated three times with changes. In the first repeat, the amount of AIBN is doubled and the polymerization temperature raised. This yields lower molecular weight products. In the second and third repeats, the vinylacetamide:methylmethacrylate ratio is changed from 0.50:0.50 to 0.65:0.35 to 0.10:0.90 by varying feed content.

EXAMPLE IV

The preparation of Example I is repeated with a change. In place of 33 g of methylmethacrylate, 32.5 g (0.33 mole) of maleic anhydride is used. This yields in part A a 0.50:0.50 maleic anhydride/vinylacetamide copolymer. Hydrolysis converts this to the free diacid-/amine acid salt equivalent.

EXAMPLE V

The preparations of part A of Example I are repeated substituting for methylmethacrylate 19 g (0.33 mole) of allyl alcohol. This yields the 0.50:0.50 allylalcohol/vinylacetamide copolymer. Hydrolysis converts this to the corresponding allylalcohol/vinylamine copolymer.

I claim:

1. A copolymer consisting of randomly distributed repeating units represented by the formula

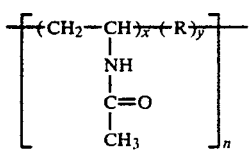

wherein R is the radical selected from the group

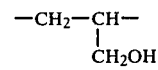

or the $C_1$ to $C_6$ carboxylic acid esters thereof

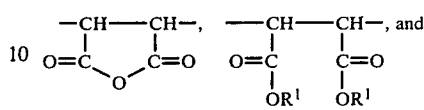

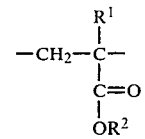

wherein $R^1$ is hydrogen or a $C_1$ to $C_6$ alkyl; $R^2$ is a $C_1$ to $C_6$ alkyl; x and y are numbers greater than zero totaling to 1.00, the ratio of x to y is from about 0.05:0.95 to about 0.95:0.05; and n is an integer from about 14 to about 10,000.

2. The copolymer of claim 1 wherein R is the radical

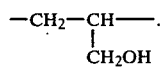

3. The copolymer of claim 2 wherein the ratio of x to y is from 0.25:0.75 to 0.75:0.25 and n is an integer from about 50 to about 6000.

4. The copolymer of claim 1 wherein R is the radical

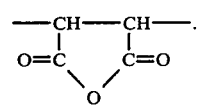

5. The copolymer of claim 4 wherein the ratio of x to y is from 0.25:0.75 to 0.75:0.25; n is the integer from about 50 to about 600.

6. The copolymer of claim 1 wherein R is the radical

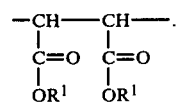

7. The copolymer of claim 6 wherein the ratio of x to y is from 0.25:0.75 to 0.75:0.25 and n is an integer from about 3600 to about 7200.

8. The copolymer of claim 1 wherein R is the radical

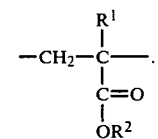

9. The copolymers of claim 8 wherein $R^1$ and $R^2$ are methyl.

10. The copolymers of claim 8 wherein the ratio of x to y is from 0.25:0.75 to 0.75:0.25; n is the integer from about 50 to about 6000.

* * * * *